United States Patent
Collins et al.

(10) Patent No.: US 12,544,321 B2
(45) Date of Patent: Feb. 10, 2026

(54) HAIR TREATMENT METHOD

(71) Applicant: Conopco, Inc., Englewood Cliffs, NJ (US)

(72) Inventors: Luisa Zoe Collins, Chester (GB); Rongrong Zhou, Wirral (GB)

(73) Assignee: Conopco, Inc., Englewood Cliffs, NJ (US)

( * ) Notice: Subject to any disclaimer, the term of this patent is extended or adjusted under 35 U.S.C. 154(b) by 317 days.

(21) Appl. No.: 18/554,695

(22) PCT Filed: Apr. 6, 2022

(86) PCT No.: PCT/EP2022/059049
§ 371 (c)(1),
(2) Date: Oct. 10, 2023

(87) PCT Pub. No.: WO2022/218767
PCT Pub. Date: Oct. 20, 2022

(65) Prior Publication Data
US 2024/0180801 A1 Jun. 6, 2024

(30) Foreign Application Priority Data
Apr. 15, 2021 (EP) .................................... 21168736

(51) Int. Cl.
*A61K 8/27* (2006.01)
*A61K 8/73* (2006.01)
*A61K 8/81* (2006.01)
*A61Q 5/02* (2006.01)
*A61Q 5/12* (2006.01)

(52) U.S. Cl.
CPC ............... *A61K 8/27* (2013.01); *A61K 8/737* (2013.01); *A61K 8/8141* (2013.01); *A61Q 5/02* (2013.01); *A61Q 5/12* (2013.01)

(58) Field of Classification Search
None
See application file for complete search history.

(56) References Cited

U.S. PATENT DOCUMENTS

| 9,375,393 B2 | 6/2016 | Lalleman et al. |
| 10,556,133 B2 | 2/2020 | Dussaud et al. |
| 2012/0076747 A1 | 3/2012 | Bierganns et al. |
| 2021/0077377 A1 | 3/2021 | Moghadam et al. |

FOREIGN PATENT DOCUMENTS

| DE | 9210516 | * 12/1993 | ............. A61Q 19/00 |
| JP | 2019104706 | 6/2019 | |
| WO | WO2021074012 | 4/2021 | |
| WO | WO-2021074012 A1 | * 4/2021 | ............... A61Q 5/02 |

OTHER PUBLICATIONS

GNPD Database (Online) Mintel; Antifrizz Shampoo; Millanel Cosmetica Active Hair Lacios Itensios; Jan. 2012; pp. 1-2, Record ID 1690504; XP002736243; Argentina.
GNPD Database (Online) Mintel; Frizz Control Shampoo; Infusium 23; May 2005; pp. 1-2; Record ID 10219545; XP002744721; United States of America.
IPRP1 in PCTEP2022059049; Oct. 26, 2023; World Intellectual Property Org. (WIPO).
Maria Fernanda Reis Gavazzoni Dias; Hair Cosmetics: An Overview; International Journal of Trichology; Jan.-Mar. 2015; pp. 1-21, XP055757932; 7(1).
Search Report and Written Opinion in EP21168736; Oct. 11, 2021; European Patent Office (EPO).
Search Report and Written Opinion in PCTEP2022059049; Aug. 8, 2022; World Intellectual Property Org. (WIPO).

* cited by examiner

*Primary Examiner* — Brian Gulledge
(74) *Attorney, Agent, or Firm* — Byrne Poh LLP; Nina R. Horan

(57) ABSTRACT

A method of providing anti-frizz to hair, comprising the steps of: (i) applying a shampoo composition to the hair, wherein the composition comprises (a) from 0.05 wt % to 1.4 wt % a soluble zinc compound. (b) a cleansing surfactant selected from anionic surfactants and mixtures thereof. (c) from 0.1 wt % to 10 wt % of a suspending agent, and (d) from 0.01 wt % to 5 wt % of a cationic deposition polymer; and; wherein the composition has a pH of from 3 to 5; and (ii) rinsing the composition from the hair.

15 Claims, No Drawings

HAIR TREATMENT METHOD

CROSS-REFERENCE TO RELATED APPLICATIONS

This application is a U.S. national phase application under 35 U.S.C. § 371 of International Application No. PCT/EP2022/059049, filed on Apr. 6, 2022, which claims priority to European Patent Application No. 21168736.3, filed on Apr. 15, 2021, the entire disclosures of which are incorporated herein by reference in their entireties, for any and all purposes.

FIELD OF THE INVENTION

The present invention lies in the field of rinse-off shampoo compositions comprising a zinc salt and relates, in particular, to rinse-off shampoo compositions for hair frizz reduction.

BACKGROUND OF THE INVENTION

Frizz is generally known as hair that does not align with the surrounding hairs, but stands up or curls independently, creating a fuzzy or irregular texture. Generally, hair gets frizzy on days when there is humid weather and the level of moisture in the air is high. As a result, hair appears dry and frizzy instead of smooth, shiny and defined. The appearance of frizz and loss of shine and smoothness are associated with a perception of poor hair health.

US 2016/0158128 discloses a rinse-off conditioner composition for hair frizz reduction comprising from about 0.2% to about 20% of a moisture control material or mixture of moisture control materials.

US2013340784A discloses a cosmetic composition comprising at least non-nitrogenous zinc salt and at least one cationic surfactant chosen from defined quaternary ammonium salts, in a specific weight ratio. A process for treating keratin fibres, using the composition, and to the use of the composition, preferably in the form of a leave-on care product, for conditioning keratin fibres and protecting their artificial colour from fading, are also disclosed.

Despite the prior art, there remains a need to provide a rinse off product that delivers improved frizz control.

The present inventors have found that hair treated with cleansing compositions comprising certain zinc compounds can provide anti frizz benefits.

Definition of the Invention

A first aspect of the invention provides a method of providing anti-frizz to hair, comprising the steps of:
(i) applying a shampoo composition to the hair, wherein the composition comprises (a) from 0.05 to 1.4 wt % a soluble zinc compound,
(b) a cleansing surfactant selected from anionic surfactants and mixtures thereof,
(c) from 0.1 to 10 wt % of a suspending agent, and
(d) from 0.01 to 5 wt % of a cationic deposition polymer; and wherein the composition has a pH of from 3 to 5; and
(ii) rinsing the composition from the hair.

A use is also provided, of a composition according to the first aspect, to provide anti frizz to hair.

Zinc Compounds

Compositions for use in the invention comprise a soluble zinc compound.

By soluble is meant a solubility of $4.0 \times 10^4$ mg/L or more in water at 25° C.

Preferred zinc compounds are selected from zinc sulphate, zinc chloride, zinc gluconate, zinc acetate and mixtures thereof, most preferably zinc sulphate.

The level of zinc compound in the total composition is preferably from 0.05 to 1.4 wt %, more preferably from 0.1 to 1.25 wt %, most preferably from 0.1 to 1 wt %.

The pH of the formulations of the invention are in the range from pH 3 to pH 6, more preferably used at pH 3-5.

Hair treatment compositions for use in the invention take the form of a shampoo.

The composition is formulated as a rinse off product. In the context of this invention rinse off products are applied to the hair left for a maximum time of 20 minutes then rinsed off.

A preferred method of treatment comprises the following sequential steps
i) application of a shampoo composition to the hair, wherein the composition comprises from 0.05 to 1.4 wt % a soluble zinc compound and a cleansing surfactant selected from anionic surfactants and mixtures thereof; and wherein the composition has a pH of from 3 to 5, for a maximum time period of 20 minutes, preferably from 20 seconds to 10 minutes, more preferably from 30 seconds to 5 minutes, most preferably from 40 seconds to 2 minutes; and
ii) rinsing the hair.

Shampoo compositions for use in method of the invention are generally aqueous, i.e. they have water or an aqueous solution or a lyotropic liquid crystalline phase as their major component.

Suitably, the shampoo composition will comprise from 50 to 98%, preferably from 60 to 90% water by weight based on the total weight of the composition.

Shampoo compositions will generally comprise one or more cleansing surfactants.

Surfactants are compounds which have hydrophilic and hydrophobic portions that act to reduce the surface tension of the aqueous solutions they are dissolved in. Shampoo compositions for use in the method of the invention will generally comprise one or more cleansing surfactants, which are cosmetically acceptable and suitable for topical application to the hair. The cleansing surfactant may be chosen from anionic, non-ionic, amphoteric and zwitterionic compounds and mixtures thereof, preferably anionic.

The total amount of cleansing surfactant in a shampoo composition for use in the invention is generally from 1 to 50%, preferably from 2 to 40%, more preferably from 4 to 25% by total weight surfactant based on the total weight of the composition.

Non-limiting examples cleansing surfactants include anionic cleansing surfactants include; alkyl sulphates, alkyl ether sulphates, alkaryl sulphonates, N-alkyl sarcosinates, alkyl phosphates, alkyl ether phosphates, acyl amino acid based surfactants, alkyl ether carboxylic acids, acyl taurates, acyl glutamates, alkyl glycinates and salts thereof, especially their sodium, magnesium, ammonium and mono-, di- and triethanolamine salts. The alkyl and acyl groups in the preceding list generally contain from 8 to 18, preferably from 10 to 16 carbon atoms and may be unsaturated. The alkyl ether sulphates, alkyl ether phosphates and alkyl ether carboxylic acids and salts thereof may contain from 1 to 20 ethylene oxide or propylene oxide units per molecule.

Further non-limiting examples of cleansing surfactants may include non-ionic cleansing surfactants including; aliphatic ($C_8$-$C_{18}$) primary or secondary linear or branched chain alcohols with alkylene oxides, usually ethylene oxide and generally having from 6 to 30 ethylene oxide groups. Other representative cleansing surfactants include mono- or dialkyl alkanolamides (examples include coco mono-ethanolamide and coco mono-isopropanolamide) and alkyl polyglycosides (APGs). Suitable alkyl polyglycosides for use in the invention are commercially available and include for example those materials identified as: Plantapon 1200 and Plantapon 2000 ex BASF. Other sugar-derived surfactants, which can be included in compositions for use in the invention include the $C_{10}$-$C_{18}$ N-alkyl ($C_1$-$C_6$) polyhydroxy fatty acid amides, such as the $C_{12}$-$C_{18}$ N-methyl glucamides, as described for example in WO 92 06154 and U.S. Pat. No. 5,194,639, and the N-alkoxy polyhydroxy fatty acid amides, such as $C_{10}$-$C_{18}$ N-(3-methoxypropyl) glucamide.

Additional non-limiting examples of cleansing surfactants may include amphoteric or zwitterionic cleansing surfactants including; alkyl amine oxides, alkyl betaines, alkyl amidopropyl betaines, alkyl sulphobetaines (sultaines), alkyl glycinates, alkyl carboxyglycinates, alkyl amphoacetates, alkyl amphopropionates, alkylamphoglycinates, alkyl amidopropyl hydroxysultaines, acyl taurates and acyl glutamates, wherein the alkyl and acyl groups have from 8 to 19 carbon atoms.

Typical cleansing surfactants for use in shampoo compositions for use in the invention include sodium oleyl succinate, ammonium lauryl sulphosuccinate, sodium lauryl sulphate, sodium lauryl ether sulphate, sodium lauryl ether sulphosuccinate, ammonium lauryl sulphate, ammonium lauryl ether sulphate, sodium cocoyl isethionate, sodium lauryl isethionate, lauryl ether carboxylic acid and sodium N-lauryl sarcosinate, sodium pareth sulphate, cocodimethyl sulphopropyl betaine, lauryl betaine, coco betaine, cocamidopropyl betaine, sodium cocoamphoacetate.

Preferred cleansing surfactants are sodium lauryl sulphate, sodium lauryl ether sulphate (n)EO, (where n is from 1 to 3, preferably 2 to 3, most preferably 3), ammonium lauryl sulphate, ammonium lauryl ether sulphate(n)EO, (where n is from 1 to 3, preferably 2 to 3, most preferably 3), sodium cocoyl isethionate and lauryl ether carboxylic acid, coco betaine, cocamidopropyl betaine, sodium cocoamphoacetate.

Mixtures of any of the foregoing anionic, non-ionic and amphoteric cleansing surfactants may also be suitable, preferably where the primary to secondary surfactant ratio is between 1:1-10:1, more preferably 2:1-9:1 and most preferably 3:1-8:1, based on the inclusion weight of the cleansing surfactant in the shampoo composition.

Cationic deposition polymers are used in the shampoo compositions of the invention.

Suitable cationic deposition polymers may be homopolymers which are cationically substituted or may be formed from two or more types of monomers. The weight average ($M_w$) molecular weight of the polymers will generally be between 100 000 and 3 million daltons. The polymers will have cationic nitrogen containing groups such as quaternary ammonium or protonated amino groups, or a mixture thereof. If the molecular weight of the polymer is too low, then the conditioning effect is poor. If too high, then there may be problems of high extensional viscosity leading to stringiness of the composition when it is poured.

The cationic nitrogen-containing group will generally be present as a substituent on a fraction of the total monomer units of the cationic deposition polymer. Thus when the polymer is not a homopolymer it can contain spacer non-cationic monomer units. Such polymers are described in the CTFA Cosmetic Ingredient Directory, 3rd edition. The ratio of the cationic to non-cationic monomer units is selected to give polymers having a cationic charge density in the required range, which is generally from 0.2 to 3.0 meq/gm. The cationic charge density of the polymer is suitably determined via the Kjeldahl method as described in the US Pharmacopoeia under chemical tests for nitrogen determination.

Suitable cationic deposition polymers include, for example, copolymers of vinyl monomers having cationic amine or quaternary ammonium functionalities with water soluble spacer monomers such as (meth)acrylamide, alkyl and dialkyl (meth)acrylamides, alkyl (meth)acrylate, vinyl caprolactone and vinyl pyrrolidine. The alkyl and dialkyl substituted monomers preferably have $C_1$-$C_7$ alkyl groups, more preferably $C_1$-3 alkyl groups. Other suitable spacers include vinyl esters, vinyl alcohol, maleic anhydride, propylene glycol and ethylene glycol.

The cationic amines can be primary, secondary or tertiary amines, depending upon the particular species and the pH of the composition. In general, secondary and tertiary amines, especially tertiary, are preferred.

Amine substituted vinyl monomers and amines can be polymerised in the amine form and then converted to ammonium by quaternization.

The cationic deposition polymers can comprise mixtures of monomer units derived from amine- and/or quaternary ammonium-substituted monomer and/or compatible spacer monomers.

Preferred cationic deposition polymers are selected from cationic diallyl quaternary ammonium-containing polymers, mineral acid salts of amino-alkyl esters of homo- and co-polymers of unsaturated carboxylic acids having from 3 to 5 carbon atoms, cationic polyacrylamides, cationic polysaccharide polymers and mixtures thereof.

Suitable (non-limiting examples of) cationic deposition polymers include:
  cationic diallyl quaternary ammonium-containing polymers including, for example, dimethyldiallylammonium chloride homopolymer and copolymers of acrylamide and dimethyldiallylammonium chloride, referred to in the industry (CTFA) as Polyquaternium 6 and Polyquaternium 7, respectively;
  mineral acid salts of amino-alkyl esters of homo- and co-polymers of unsaturated carboxylic acids having from 3 to 5 carbon atoms, (as described in U.S. Pat. No. 4,009,256);
  cationic polyacrylamides (as described in WO95/22311).

Other cationic deposition polymers that can be used include cationic polysaccharide polymers, such as cationic cellulose derivatives, cationic starch derivatives, and cationic guar gum derivatives.

Cationic polysaccharide polymers suitable for use in compositions for use in the invention include monomers of the formula:

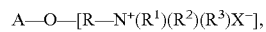

wherein: A is an anhydroglucose residual group, such as a starch or cellulose anhydroglucose residual. R is an alkylene, oxyalkylene, polyoxyalkylene, or hydroxyalkylene group, or combination thereof. $R^1$, $R^2$ and $R^3$ independently represent alkyl, aryl, alkylaryl, arylalkyl, alkoxyalkyl, or alkoxyaryl groups, each group containing up to about 18 carbon atoms. The total number of carbon atoms for each cationic moiety (i.e., the sum of carbon atoms in $R^1$, $R^2$ and $R^3$) is preferably about 20 or less, and X is an anionic counterion.

Another type of cationic cellulose includes the polymeric quaternary ammonium salts of hydroxyethyl cellulose reacted with lauryl dimethyl ammonium-substituted epoxide, referred to in the industry (CTFA) as Polyquaternium 24. These materials are available from the Amerchol Corporation, for instance under the tradename Polymer LM-200.

Other suitable cationic polysaccharide polymers include quaternary nitrogen-containing cellulose ethers (e.g. as described in U.S. Pat. No. 3,962,418), and copolymers of etherified cellulose and starch (e.g. as described in U.S. Pat. No. 3,958,581). Examples of such materials include the polymer LR and JR series from Dow, generally referred to in the industry (CTFA) as Polyquaternium 10.

A particularly suitable type of cationic polysaccharide polymer that can be used is a cationic guar gum derivative, such as guar hydroxypropyltrimethylammonium chloride (commercially available from Rhodia in their JAGUAR trademark series). Examples of such materials are JAGUAR C13S, JAGUAR C14 and JAGUAR C17.

Mixtures of any of the above cationic deposition polymers may be used.

Cationic deposition polymer will generally be present in a shampoo composition for use in the invention at levels of from 0.01 to 5%, preferably from 0.02 to 1%, more preferably from 0.05 to 0.8% by total weight of cationic polymer based on the total weight of the composition.

A composition for use in the method and use of the invention comprises a suspending agent. Suitable suspending agents are selected from polyacrylic acids, cross-linked polymers of acrylic acid, copolymers of acrylic acid with a hydrophobic monomer, copolymers of carboxylic acid-containing monomers and acrylic esters, cross-linked copolymers of acrylic acid and acrylate esters, heteropolysaccharide gums and crystalline long chain acyl derivatives and mixtures thereof. The long chain acyl derivative is desirably selected from ethylene glycol stearate, alkanolamides of fatty acids having from 16 to 22 carbon atoms and mixtures thereof. Ethylene glycol distearate and polyethylene glycol 3 distearate are preferred long chain acyl derivatives, since these impart pearlescence to the composition. Polyacrylic acid is available commercially as Carbopol 420, Carbopol 488 or Carbopol 493. Polymers of acrylic acid cross-linked with a polyfunctional agent may also be used; they are available commercially as Carbopol 910, Carbopol 934, Carbopol 941 and Carbopol 980. An example of a suitable copolymer of a carboxylic acid containing monomer and acrylic acid esters is Carbopol 1342. All Carbopol (trademark) materials are available from Goodrich.

Suitable cross-linked polymers of acrylic acid and acrylate esters are Pemulen TR1 or Pemulen TR2. A suitable heteropolysaccharide gum is xanthan gum, for example that available as Kelzan mu.

Mixtures of any of the above suspending agents may be used. Preferred is a mixture of cross-linked polymer of acrylic acid and crystalline long chain acyl derivative.

Suspending agent will generally be present in a shampoo composition for use in the method and use of the invention at levels of from 0.1 to 10%, preferably from 0.1 to 5%, more preferably from 0.1 to 3% by total weight of suspending agent based on the total weight of the composition.

Compositions for use in the method of the invention will preferably also contain one or more emulsified silicones, for enhancing conditioning performance.

The emulsified silicone is preferably selected from the group consisting of polydiorganosiloxanes, silicone gums, amino functional silicones and mixtures thereof.

Suitable silicones include polydiorganosiloxanes, in particular polydimethylsiloxanes which have the CTFA designation dimethicone. Also suitable for use in compositions for use in the method of the invention (particularly shampoos and conditioners) are polydimethyl siloxanes having hydroxyl end groups, which have the CTFA designation dimethiconol. Also suitable are silicone gums having a slight degree of cross-linking, as are described for example in WO 96/31188.

The viscosity of the emulsified silicone itself (not the emulsion or the final hair conditioning composition) is typically at least 10,000 cst at 25° ° C. the viscosity of the silicone itself is preferably at least 60,000 cst, most preferably at least 500,000 cst, ideally at least 1,000,000 cst. Preferably the viscosity does not exceed $10^9$ cst for ease of formulation.

Emulsified silicones for use in the shampoo compositions will typically have a D90 silicone droplet size in the composition of less than 30, preferably less than 20, more preferably less than 10 micron, ideally from 0.01 to 1 micron. Silicone emulsions having an average silicone droplet size (D50) of 0.15 micron are generally termed microemulsions.

Silicone particle size may be measured by means of a laser light scattering technique, for example using a 2600D Particle Sizer from Malvern Instruments.

Examples of suitable pre-formed emulsions include Xiameter MEM 1785 and microemulsion DC2-1865 available from Dow Corning. These are emulsions/microemulsions of dimethiconol. Cross-linked silicone gums are also available in a pre-emulsified form, which is advantageous for ease of formulation.

A further preferred class of silicones for inclusion in shampoos and conditioners of the invention are amino functional silicones. By "amino functional silicone" is meant a silicone containing at least one primary, secondary or tertiary amine group, or a quaternary ammonium group. Examples of suitable amino functional silicones include: polysiloxanes having the CTFA designation "amodimethicone".

Specific examples of amino functional silicones suitable for use in the invention are the aminosilicone oils DC2-8220, DC2-8166 and DC2-8566 (all ex Dow Corning).

Suitable quaternary silicone polymers are described in EP-A-0 530 974. A preferred quaternary silicone polymer is K3474, ex Goldschmidt.

Also suitable are emulsions of amino functional silicone oils with non ionic and/or cationic surfactant.

Pre-formed emulsions of amino functional silicone are also available from suppliers of silicone oils such as Dow Corning and General Electric. Specific examples include DC939 Cationic Emulsion and the non-ionic emulsions DC2-7224, DC2-8467, DC2-8177 and DC2-8154 (all ex Dow Corning).

The total amount of silicone emulsion is from 0.01 wt % to 10 wt % of the total composition preferably from 0.1 wt % to 5 wt %, more preferably 0.5 wt % to 3 wt % is a suitable level.

The compositions for use in the method and use of the invention preferably comprise a preservative. A preferred preservative is sodium benzoate.

Where present, the preservative is preferably present in an amount of from 0.01 to 2 wt %, more preferably 0.01 to 1 wt %, most preferably 0.1 to 1 wt %, by total weight of the composition.

Form of Composition

A composition for use in the method of the invention may contain other ingredients for enhancing performance and/or consumer acceptability. Such ingredients include fragrance, dyes and pigments, pH adjusting agents, pearlescers or opacifiers, viscosity modifiers. Each of these ingredients will be present in an amount effective to accomplish its purpose. Generally these optional ingredients are included individually at a level of up to 5% by weight of the total composition.

Hair treatment compositions for use in the method of the invention are primarily intended for topical application to the hair and/or scalp of a human subject, for the treatment of, damaged hair. Rinse-off compositions are preferred.

The invention will be further illustrated by the following, non-limiting Examples, in which all percentages quoted are by weight based on total weight unless otherwise stated.

EXAMPLES

Example 1: Shampoo Compositions 1 and 2 in Accordance with the Invention and Comparative Compositions A and B Five hair shampoo formulations were prepared and used to treat hair prior to anti-frizz measurement. The compositions are given in Table 1.

TABLE 1

Ingredients (wt %) of Compositions 1 and 2 in accordance with the invention and comparative compositions A and B.

| Ingredient | Amount (wt %) | | | |
| --- | --- | --- | --- | --- |
|  | 1 | 2 | A | B |
| Zinc Sulphate Heptahydrate | 0.2 | 0.6 | — | 1.5 |
| Sodium Laureth Ether Sulfate | 12.0 | 12.0 | 12.0 | 12.0 |
| Co-surfactant | 1.6 | 1.6 | 1.6 | 1.6 |
| Mica | 0.15 | 0.15 | 0.15 | 0.15 |
| Suspending agent (Polyacrylic acid; Carbopol 980) | 0.4 | 0.4 | 0.4 | 0.4 |
| Deposition polymer (Guar Hydroxypropyltrimonium Chloride; Jaguar C14S) | 0.2 | 0.2 | 0.2 | 0.2 |
| Silicone emulsion | 0.75 | 0.75 | 0.75 | 0.75 |
| Sodium Chloride | 0.55 | 0.55 | 0.55 | 0.55 |
| Citric acid to required pH | 4.5 | 4.5 | 4.5 | 4.5 |
| Water & minors (including perfume and preservative) | to 100 | to 100 | to 100 | to 100 |

Formulations were made as follows: All ingredients were mixed to make a shampoo base, then the zinc salt was added in compositions in accordance with the invention. Finally, the pH was adjusted with citric acid and the viscosity adjusted with sodium chloride.

Example 2: Treatment of Hair with Compositions 1, 2, A and B and Hair Expansion Volume Measurements The hair used was dark brown European curly hair, in switches of 2 g weight and 10 inch length.

The hair was treated with Compositions 1, 2, A and B as follows:—

Hair was first treated with a cleansing shampoo using the following method:—

The hair fibres were held under running water for 30 seconds, shampoo applied at a dose of 0.1 ml of shampoo per 1 g of hair and rubbed into the hair for 30 seconds. Excess lather was removed by holding under running water for 30 seconds and the shampoo stage repeated. The hair was rinsed under running water for 30 seconds.

The wet hair was then treated with Shampoos 1, 2, A or B using the following method:—Shampoo was applied to the wet hair at a dose of 0.1 g of shampoo per 1 g of hair and rubbed into the hair for 30 seconds. Excess lather was removed by holding under running water for 30 seconds and the shampoo stage repeated. The hair was rinsed under running water for 30 seconds, and excess water removed.

4 replicates hair switches were prepared for each shampoo. The hair switches were photographed in a controlled humidity chamber after dried in humidity chamber at 20° C. 50% RH overnight; hair switches were also photographed after stored in 30° C. 80% RH humidity chamber for another 3 hours. Hair expansion volumes were analyzed using image analysis software.

Mean hair expansion volume measured on hair switches treated with Shampoos 1, 2, A and B at both 20° C. 50% RH and 30° C. 80% RH are shown in Table 1.

TABLE 2

Mean hair expansion volume ($mm^2$) for hair treated with Shampoos 1, 2, A and B

|  | 1 | 2 | A | B |
| --- | --- | --- | --- | --- |
| 20° C., 50% RH | 6002 | 2503 | 10845 | 11654 |
| 30° C., 80% RH | 10668 | 5723 | 12913 | 13464 |

At 20° C., 50% RH, Shampoos 1 & 2 produce lower hair expansion volume than comparative shampoos A and B.

At 30° C., 80% RH, Shampoos 1 & 2 produce lower hair expansion volume than comparative shampoos A and B.

Shampoo 2 provides particularly excellent hair expansion volume at a level of 0.6 wt % Zn, even compared with Shampoo B, which comprises 1.5 wt % Zn but does not provide anti-frizz benefits.

Example 3: Treatment and Volume Measurement of Untreated Switches for Calculation of Frizz Reduction 4 hair switches (2 g×10") were washed with a cleansing shampoo. The switches were dried in a high temperature environment for 60 to 80 minutes)(50° C.). Once the switches were fully dry, they were combed several times to create an extremely frizzy switch. Frizz images were taken using the Image Analysis Volume Rig. The images were taken for each of hair switches to obtain a 3D volume area.

Hair expansion volume of each treated hair switch was compared with untreated (extremely frizzy) switch volume values. Frizz reduction can thus be calculated.

% Frizz reduction=(([1]base wash volume−[2]treated volume)/base wash volume)*100.

[1]volume of switches after cleaning with shampoo and frizzed up with a comb providing maximum frizz ²volume of treated switches after drying at 20° C. 50% RH and exposed for 3 hours in high humidity (30° ° C., 80% RH)

Frizz reduction (%) was for each switch. The average of 4 switches is given in table 3.

TABLE 3

Frizz Reduction for Hair Treated with Shampoos 1, 2, 3, A and B

| Shampoo | Average % Frizz reduction |
|---|---|
| 1 | 43.0 |
| 2 | 69.4 |
| A | 31.0 |
| B | 28.0 |

The above table shows that Shampoo 1 and 2 have better frizz reduction than Shampoo A and B. Shampoo 2 with optimal zinc level shows a remarkable reduction of 69%.

The invention claimed is:

1. A method of providing anti-frizz to hair, the method comprising the steps of
   (i) applying a shampoo composition to the hair, wherein the shampoo composition comprises
   (a) from 0.05 wt % to 1.4 wt % a soluble zinc compound,
   (b) a cleansing surfactant selected from anionic surfactants and mixtures thereof,
   (c) from 0.1 wt % to 10 wt % of a suspending agent, and
   (d) from 0.01 wt % to 5 wt % of a cationic deposition polymer; and
   wherein the composition has a pH of from 3 to 5; and
   (ii) rinsing the composition from the hair.

2. The method of claim 1, wherein the soluble zinc compound is selected from the group consisting of zinc sulphate, zinc chloride, zinc gluconate, zinc acetate, and mixtures thereof.

3. The method of claim 2, wherein the soluble zinc compound is zinc sulphate.

4. The method of claim 1, wherein a level of soluble zinc compound in the total composition is from 0.1 wt % to 1.25 wt % by weight of the total composition.

5. The method of claim 1, wherein the composition further comprises a preservative.

6. The method of claim 1, wherein the composition further comprises from 0.01 wt % to 10 wt % of an emulsified silicone.

7. The method of claim 1, wherein the suspending agent is selected from the group consisting of polyacrylic acids, cross-linked polymers of acrylic acid, copolymers of acrylic acid with a hydrophobic monomer, copolymers of carboxylic acid-containing monomers and acrylic esters, cross-linked copolymers of acrylic acid and acrylate esters, heteropolysaccharide gums and crystalline long chain acyl derivatives and mixtures thereof.

8. The method of claim 7, wherein the suspending agent is a mixture of a cross-linked polymer of acrylic acid and a crystalline long chain acyl derivative.

9. The method of claim 1, wherein the suspending agent is present in an amount of from 0.1 wt % to 5 wt %.

10. The method of claim 1, wherein the cationic deposition polymer is selected from the group consisting of cationic diallyl quaternary ammonium-containing polymers, mineral acid salts of amino-alkyl esters of homo- and co-polymers of unsaturated carboxylic acids having from 3 to 5 carbon atoms, cationic polyacrylamides, cationic polysaccharide polymers and mixtures thereof.

11. The method of claim 10, wherein the cationic polysaccharide polymer is selected from the group consisting of cationic cellulose derivatives, cationic starch derivatives, cationic guar gum derivatives and mixtures thereof.

12. The method of claim 1, wherein the cationic deposition polymer is present in an amount of from 0.02 wt % to 1 wt %.

13. The method of claim 1 comprising the following sequential steps
   i) application of the shampoo composition to the hair for a maximum time period of 20 minutes; and
   ii) rinsing the hair.

14. The method of claim 1, wherein the shampoo composition provides anti-frizz to hair.

15. The method of claim 1, wherein a level of soluble zinc compound in the total composition is from 0.1 wt % to 1 wt % by weight of the total composition.

* * * * *